United States Patent [19]
Kozen

[11] Patent Number: 5,663,490
[45] Date of Patent: Sep. 2, 1997

[54] BREAKAGE DETECTION SYSTEM FOR WATER-BARRIER SHEET IN WASTE DISPOSAL FACILITY

[75] Inventor: Toru Kozen, Yonago, Japan

[73] Assignee: Daito Kogyo Co., Ltd., Tokyo, Japan

[21] Appl. No.: 631,303

[22] Filed: Apr. 10, 1996

[30] Foreign Application Priority Data

Apr. 14, 1995 [JP] Japan .................. 7-089091

[51] Int. Cl.⁶ .................. G01M 3/04; G01M 3/38
[52] U.S. Cl. .................. 73/49.2; 405/54
[58] Field of Search .................. 73/49.2 T, 49.2 R, 73/40; 405/54, 129; 588/260; 374/161, 136

[56] References Cited

U.S. PATENT DOCUMENTS

| | | | |
|---|---|---|---|
| 3,375,702 | 4/1968 | Birman | 73/40 X |
| 3,383,863 | 5/1968 | Berry | 73/40 X |
| 5,028,146 | 7/1991 | Wada | 374/161 X |
| 5,155,356 | 10/1992 | Peters et al. | 73/49.2 T |
| 5,272,910 | 12/1993 | Everett et al. | 73/49.2 R |

*Primary Examiner*—Michael Brock
*Attorney, Agent, or Firm*—Staas & Halsey

[57] ABSTRACT

A system for detecting the position of a break in a water-barrier sheet placed in a waste disposal facility for isolating wastes from the ground of the waste disposal facility includes at least one optical fiber laid in a predetermined pattern between the ground of the waste disposal facility and the water-barrier sheet and constituting a temperature sensor capable of detecting a change in temperature caused when it is flooded with leakage water flowing out from a break in the water-barrier sheet at a temperature elevated under the effect of heat generated during biodegradation of the organic substances contained in the wastes, and a temperature measuring instrument connected to said optical fiber for detecting the position of the break in the water-barrier sheet via detection of the temperature change by said temperature sensor composed of said optical fiber.

6 Claims, 5 Drawing Sheets

BREAKAGE DETECTION SYSTEM FOR WATER-BARRIER SHEET IN WASTE DISPOSAL FACILITY

BACKGROUND OF THE INVENTION

1. Field of the Invention

The present invention relates to a system for detecting the position of a break or rip in a previous water-barrier sheet placed in a waste disposal facility for isolating wastes dumped over the water-barrier sheet and the ground or soil of the waste disposal facility.

2. Description of the Related Art

Waste disposal facilities are constructed as landfill sites for the purpose of safe storage of wastes with no hindrance to preservation of our environment via stabilization and conversion to harmless materials using metabolic actions of the natural world. The wastes are generally classified into two groups according to their origin or source, namely, non-industrial wastes and industrial wastes. Aside from the classification, our activities in homes and industries deliver a wide variety of waste materials containing organic substances, such as kitchen refuse, ligneous waste, paper rubbish, fibrous waste, and organic sludges. Particularly for an organic waste containing harmful constituents, the in-ground disposal requires a careful control against a possible contamination to our environment caused due to degradation, elusion or the like transformation of the buried organic waste.

In general, wastes buried in a controlled industrial waste final disposal facility or a non-industrial waste disposal facility are decomposed or degraded by microbes as the time goes on. The buried wastes, however, still have a possibility of generating hazardous substances via chemical reactions, posing a contamination to the proximal environment including ground water and other public water resources when leaking with rain water, for example. To deal with this problem, the waste disposal facilities normally have a water-barrier sheet of synthetic resin or synthetic rubber placed for isolating the buried wastes from the ground or soil of the waste disposal facility.

The water-barrier sheet, when ruptured or otherwise damaged due, for example, to a defect in the joint structure, insufficient smoothness of the excavation surface, or an inadvertent operational error during waste dumping operation, will allow hazardous constituents in the waste materials to leak into the ground water, posing the danger of contamination to the water supply and agricultural water resources. Accordingly, early detection and subsequent mending of a break in the water-barrier sheet is of great importance to the waste disposal facility.

Various methods have been proposed for detecting leakage water from the waste disposal facility. One such known leakage detection method includes a ground-water monitoring well which is drilled in the proximity of the waste disposal site for evaluating the quality of ground water. This method, however, is unable to identify the position of leakage, and accordingly it takes a long time to detect and mend the broken part of the water-barrier sheet.

In another known method, an electric proving or surveying technique is used to detect the position of a break in the water-barrier sheet. Typical examples of such electric surveying technique are known as a potential measuring method and a current measuring method. According to the potential measuring method, a voltage is applied in and around the waste disposal site, so that the position of a leak in the water-barrier sheet can be detected from a distortion in potential distribution appearing inside the waste disposal site. On the other hand, the current measuring method utilizes upper and lower arrays of regularly spaced linear electrodes disposed crosswise on opposite sides of a water-barrier sheet to detect the position of a leak in the water-barrier sheet in terms of a change in current flowing through the electrodes.

These known electric methods, however, are low in reliability due, for example, to expert knowledge required for analyzation of data obtained, numerous uncertain factors involved, such as an underground current and a leakage current, and high susceptibility to external disturbances. Another drawback is in a low adaptability to variable factors such as aging of the buried waste materials. Accordingly, the known electric methods are unable to realize an accurate delay-free detection of a broken part of the water-barrier sheet in the waste disposal facility.

Japanese Patent Laid-open Publication No. 4-168335 discloses a leak monitoring system used in a pipe line, such as a water supply line, for monitoring a possible leak using an optical fiber laid alongside the pipe line as a temperature sensor. In general, the optical fiber when heated locally, the heated portion will generate greater quantities of scattered light than the rest or unheated portion. Taking this phenomenon into consideration, it may be resumed that a measurement of back scattered light coming back from the heated portion to one end of the optical fiber while a pulsed light beam is emitted from the same end will make it possible to determine the temperature of the heated portion according to the intensity of the back scattered light, and the position of the heated portion according to a time period between the emission of the pulsed light beam and the arrival of the back scattered light. According to the disclosed leak monitoring system, an optical fiber is laid alongside the pipe line in thermally isolated condition and at a position ready to be flooded with leakage water from the pipe line, with one end of the optical fiber connected to a back scattered light measuring instrument.

With this arrangement, when a portion of the pipe line is immersed in or flooded with leakage water from a break in the pipe line, the flooded pipe portion has a different temperature than the rest of the pipe line. Accordingly, by measuring the back scattered light of the optical fiber using the back scattered light measuring instrument, the temperature and position of the leakage water and hence the position of the break in the pipe line can be detected.

However, there is no teaching in Japanese Patent Laid-open Publication No. 4-168335 that the disclosed leak monitoring system can be used in a waste disposal facility for the purpose of detecting the position of a break in a water-barrier sheet placed in a waste disposal facility for isolating wastes from the ground or soil of the waste disposal facility. In practice, the disclosed leak monitoring system is not readily applicable to the detection of a broken part of the water-barrier sheet in the waste disposal facility to which the present invention pertains.

Japanese Patent Laid-open Publication No. 4-294236 discloses a method of detecting the position of a flooded portion of an optical fiber composite overhead-earth line, in which water penetrating into the optical fiber composite overhead-earth line can be detected by an optical fiber temperature distribution sensor in terms of a change in temperature caused by an exothermic reaction or an endothermic reaction between the penetrating water and a material which is capable of generating or absorbing heat when reacted with water. Typical examples of the exothermic material are calcium chloride (CaCl$_2$) and ferrous chloride (FeCl$_2$).

The detection of a broken part in the pipe line such as disclosed in Japanese Patent Laid-open Publication No. 4-294236 is far distant from the detection of a broken part of a water-barrier sheet placed in a waste disposal site for isolating wastes and the soil of the waste disposal facility. The disclosed detecting method, like the method disclosed in Japanese Patent Laid-open Publication No. 4-168335 discussed above, is not readily applicable to a breakage detection system for a water-barrier sheet in the waste disposal facility to which the present invention pertains.

SUMMARY OF THE INVENTION

With the foregoing drawbacks in view, an object of the present invention is to provide a breakage detection system for a water-barrier sheet placed in a waste disposal facility for isolating wastes from the ground of the waste disposal facility, which system requires no expert knowledge for analyzation of data obtained, insusceptible to external disturbances such as underground current or leakage current and hence highly accurate and reliable in operation, simple in construction and inexpensive to manufacture.

To achieve the foregoing object, the inventor has reverted his attention to the phenomenon in which wastes of the class containing organic substances, such as garbage, organic sludges and incinerated ashes, generate heat as they are decomposed or degraded by microbes in the earth as the time goes on and, hence, have a different temperature than the surrounding ground.

In one aspect the present invention provides a system for detecting the position of a break in a water-barrier sheet placed in a waste disposal facility for isolating wastes dumped over the water-barrier sheet from the ground of the waste disposal facility, the wastes containing biodegradable organic substances, the system comprising: at least one optical fiber laid in a predetermined pattern between the ground of the waste disposal facility and the water-barrier sheet and constituting a temperature sensor capable of detecting a change in temperature caused when it is flooded with leakage water flowing out from a break in the water-barrier sheet at a temperature elevated under the effect of heat generated during biodegradation of the organic substances contained in the wastes; and a temperature measuring instrument connected to the optical fiber for detecting the position of the break in the water-barrier sheet via detection of the temperature change by the temperature sensor composed of the optical fiber. The optical fiber is preferably loosely received in a perforated tubular sheath.

According to another aspect of the present invention, the system further includes a composite sheet composed of a water-permeable first layer and a water-impermeable second layer and placed beneath the water-barrier sheet. In this instance, the optical fiber, preferably loosely received in a perforated tubular sheath, is laid in a predetermined pattern between the composite sheet and the water-barrier sheet together with the perforated tubular sheath.

In one preferred embodiment, the water-permeable first layer of the composite sheet is placed directly over the ground of the waste disposal facility. In an alternative embodiment, the water-impermeable second layer of the composite sheet is placed directly over the ground of the waste disposal facility. The water-permeable first layer is preferably composed of an elastic sheet-like material.

According to still another aspect of the present invention, the system further includes a water-impermeable sheet placed beneath the water-barrier sheet. In this instance, the optical fiber, preferably loosely received in a perforated tubular sheath, is laid in a predetermined pattern between the water-impermeable sheet and the water-barrier sheet together with the perforated tubular sheath.

When the system is used in a waste disposal facility having an excavated generally bowl-shaped ground surface, the number of the optical fiber is plural and the plural optical fibers are preferably arranged in a pattern of concentrical loops radially spaced at regular intervals and extending along a contour of the excavated bowl-shaped ground surface of the waste disposal facility.

The organic substances, such as organic sludges and incinerated ashes, contained in the wastes stored or otherwise buried in the waste disposal facility generate heat as they are degraded or decomposed by microbes in the earth as the time goes on. With this exothermic biodegradation, the buried wastes have a higher temperature than the surrounding ground. Thus, leakage water flowing out from a break in the water-barrier sheet has an elevated temperature under the effect of heat generated during decomposition of the organic substances contained in the buried wastes. The temperature of the leakage water is detected by the optical fiber serving as a temperature sensor. The temperature measuring instrument connected to the optical fiber detects the position of the leak in the water-barrier sheet via detection of the temperature of leakage water by the temperature sensor composed of the optical fiber.

The optical fiber is operative as a temperature sensor based on the following principle: When a pulsed beam of light is emitted into the optical fiber from an end, the scattering of light which is called "Raman effect" or "Raman scattering" is observed in which the light undergoes a change in frequency and a random alteration in phase due to a change in rotational or vibrational energy of the scattering molecules. The Raman scattered light (i.e., the light scattering under the Raman effect) is greatly dependent upon the temperature, so that the temperature and position of a particular portion of the optical fiber where the Raman scatted light is generated can be determined, with good accuracy, by measuring the intensity of Raman scattered light and a time lag between the emission of pulsed light beam and the arrival of Raman scattered light at the same end of the optical fiber, respectively. Accurate measurement of the temperature and position of the scatting point is possible even when the distance from the scattering point to the end of the optical fiber is not smaller than several kilometers.

The water-impermeable second layer of the composite sheet placed beneath the water-barrier sheet completely isolates the optical fiber from ground water flowing or existing below the water-barrier sheet, so that the optical fiber serving as a temperature sensor is able to detect the temperature of leakage water from the water-barrier sheet with better accuracy. The water-permeable first layer preferably composed of an elastic mat is capable of accommodating irregularities on the excavated ground surface of the waste disposal facility and projections on the water-barrier sheet formed by correspondingly downwardly projecting parts of the buried waste materials. With the elastic first layer thus provided, the water-barrier sheet is highly resistant to rupture. The water-permeable layer also has a function to guide ground water into a drain pipe. The composite sheet may be disposed with the water-permeable first layer facing downward, or alternately with the water-impermeable second layer facing downward.

The first water-impermeable sheet has the same function as the first water-impermeable layer of the composite sheet specified above and hence insures highly accurate temperature detection of the leakage water by the optical fiber.

The above and other objects, features and advantages of the present invention will become manifest to those versed in the art upon making reference to the detailed description and the accompanying sheets of drawings in which preferred structural embodiments of the invention are shown in by way of illustrative example.

DETAILED DESCRIPTION OF THE INVENTION

The present invention will be described below in greater detail with reference certain preferred embodiments shown in the accompanying sheets of drawings.

Figure 1:
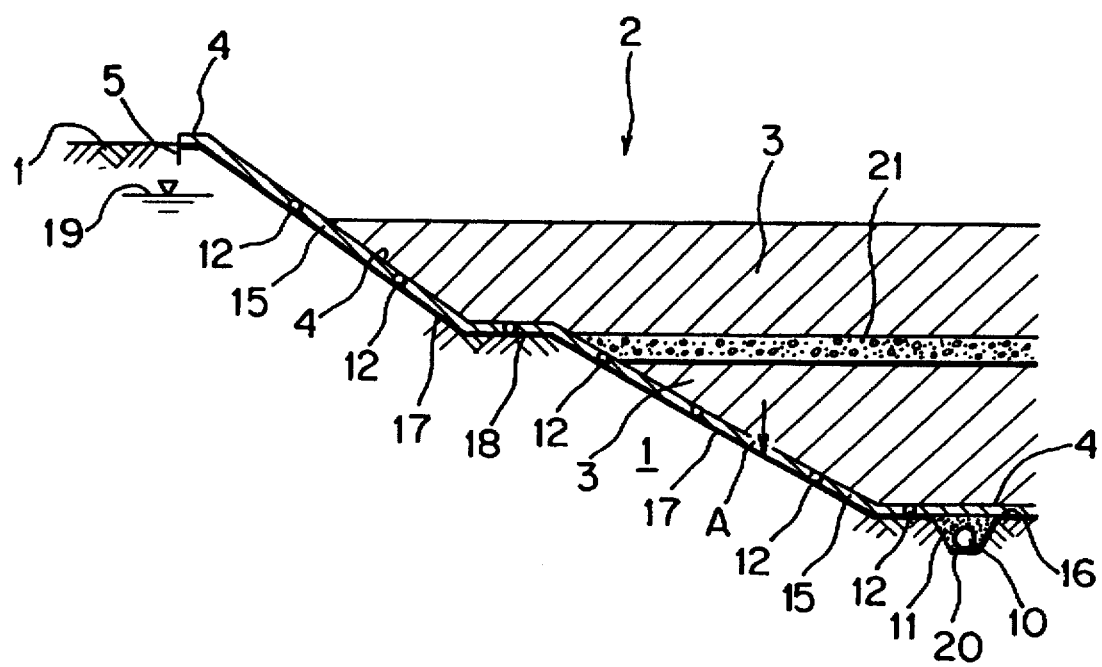
FIG. 1 is a cross-sectional view showing a main portion of a waste disposal facility in which a breakage detection system of this invention is incorporated for detecting the position of a break in a water-barrier sheet.
Figure 2:
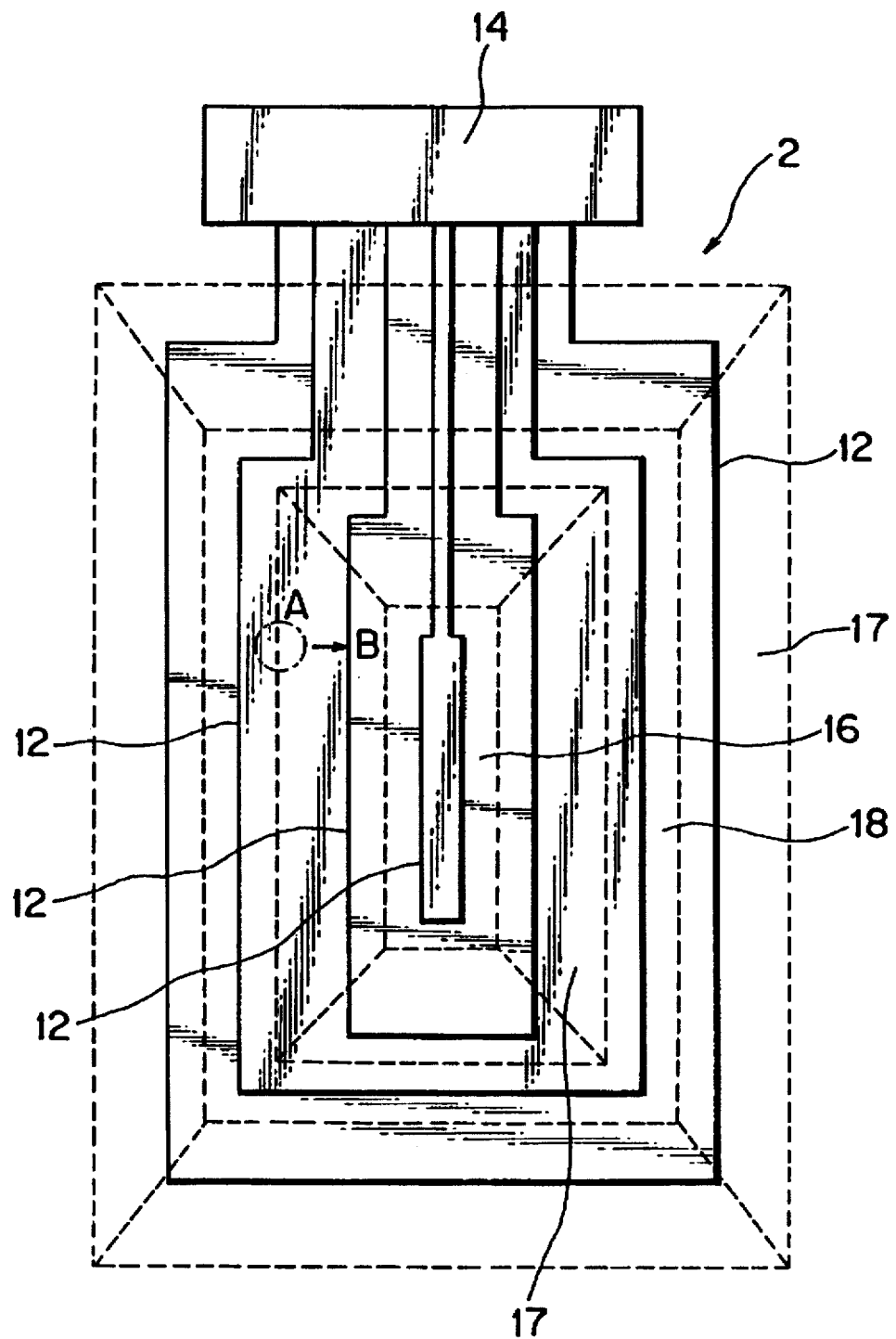
FIG. 2 is an enlarged diagrammatical plan view showing a pattern of optical fiber cables of the breakage detection system arranged in the waste disposal facility according to the present invention.
Figure 3:
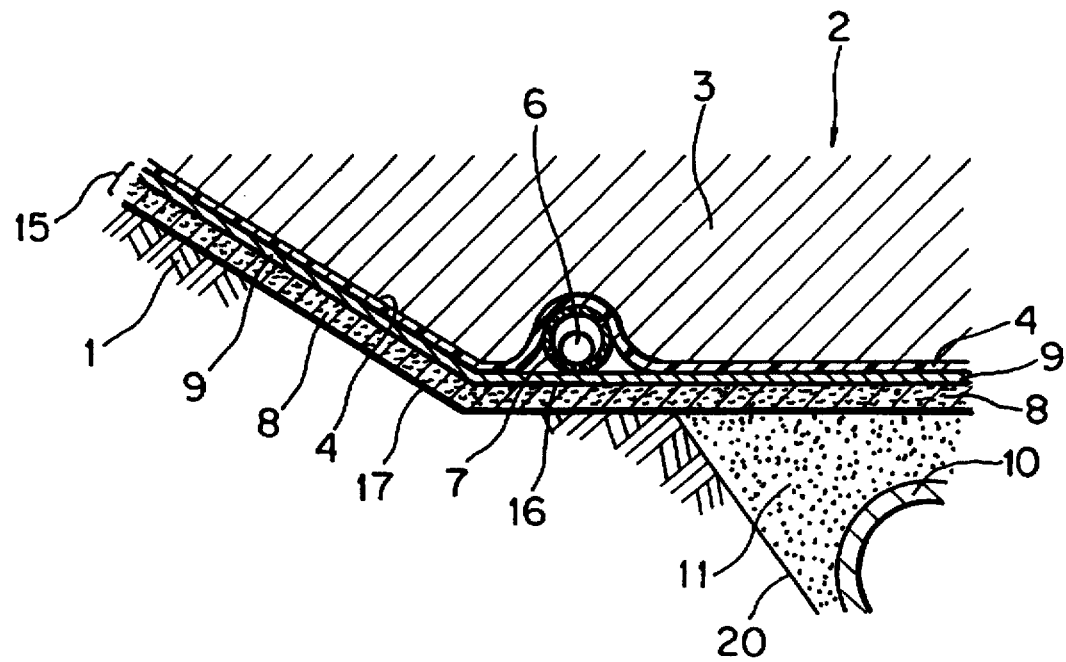
FIG. 3 is an enlarged cross-sectional view of a portion of the breakage detection system used in a waste disposal facility according to one embodiment of the present invention.
Figure 4:
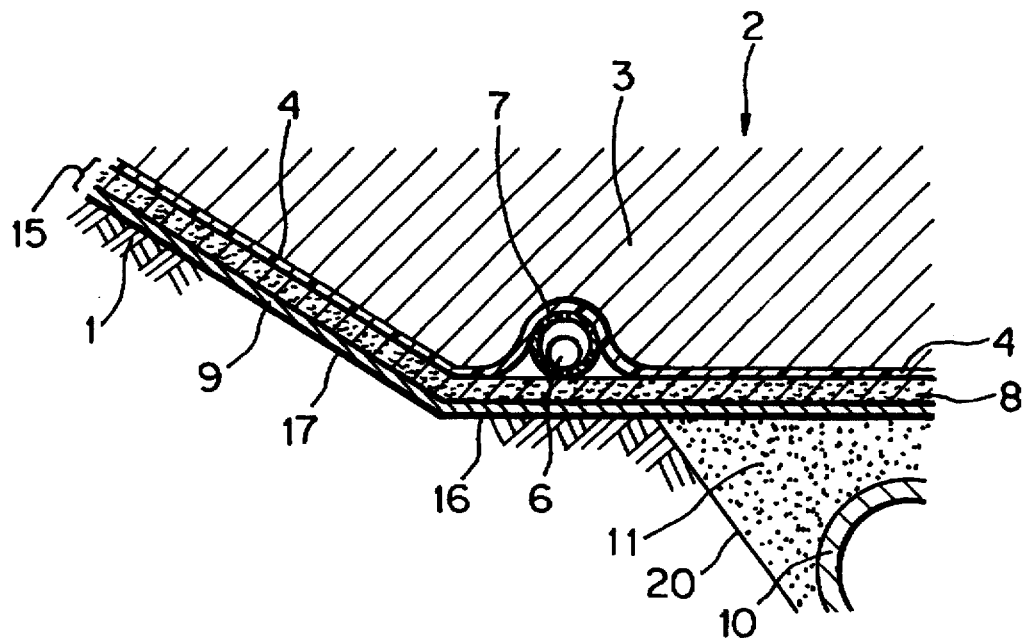
FIG. 4 is a view similar to FIG. 3, but showing a breakage detection system in the waste disposal facility according to another embodiment.

As generally shown in FIGS. 1 and 2, a waste disposal facility 2 has a ground surface 1 which is excavated into a generally bowl shape having a substantially rectangular bottom surface 16 and sloped side surfaces 17 extending upwardly from respective sides of the rectangular bottom surface 16, the side surfaces 17 each having an intermediate step 18. As best shown in FIG. 3, a composite sheet 15 is composed of a first layer 8 permeable to water and a second layer 9 impermeable to water, or resistant to penetration of water. The composite sheet 15 is placed over the excavated bowl-shaped ground surface 1 including the bottom surface 16 and side surfaces 17, with the water-permeable first layer 8 facing downward and held in direct contact with the bottom and side surfaces 16, 17. The second layer 9 is hereinafter referred to, for simplicity, as "water-impermeable layer". The water-permeable first layer 8 is preferably composed of a water-permeable elastic mat. The composite sheet 15 may be placed with the water-impermeable second layer 9 facing downward and held in direct contact with the bottom and side surfaces 16, 17 of the excavated bowl-shaped ground surface 1 of the waste disposal facility 2, as shown in FIG. 4. A plurality of optical fiber cables 12 (four being shown in FIG. 2) are arranged in a predetermined pattern, described later on, and placed over the composite sheet 15. The optical fiber cables 12 each include an optical fiber 6 loosely received in a perforated tubular sheath 7 made of stainless steel. The optical fibers 6 in the respective optical fiber cables 12 are connected in parallel to a temperature measuring instrument 14, as shown in FIG. 2, however, they may be connected in series.

The temperature measuring instrument 14 is so constructed as to emit a pulsed laser beam into the respective optical fibers 6 from one end and receive Raman scattered light coming back to the same end of the respective optical fibers 6. The optical fiber cables 12 are arranged in a pattern of concentrical loops radially spaced at regular intervals and extending along the contour of the excavated bowl-shaped ground surface 1. In the arrangement schematically shown in FIG. 2, the four optical fiber cables 12 are disposed on the bottom surface 16, a lower part of the side surfaces 17, the step 18, and an upper part of the sloped side surfaces 17, respectively.

Each of the optical fiber 6 serves as a temperature sensor. When a pulsed laser beam is emitted into the optical fiber 6, the scattering of light, known as "Raman effect" or "Raman scattering" is observed due to a change in rotational or vibrational energy of the scattering molecules. Since the Raman scattered light (i.e., the light scattering under the Raman effect) is greatly dependent upon the temperature, the temperature and position of a particular portion of the optical fiber 6 where the Raman scattered light is generated can be determined, with sufficient accuracy, by measuring, with the temperature measuring instrument 14, the intensity of Raman scattered light and a time period between the emission of pulsed light beam from one end of the optical fiber 6 and the arrival of Raman scattered light at the same end of the optical fiber 6. The measurement of the temperature and position of the scatting point is possible even when the distance between the end of the optical fiber 6 and the scatting point is not smaller than several kilometers.

As shown in FIG. 1, an impervious water-barrier sheet 4 is placed over the entire surface of the composed sheet 15 to isolate the ground surface 1 of the waste disposal facility 2 from the wastes buried in the waste disposal facility 2 for the purpose of preventing a possible release of harmful substances and hazardous water, in particular, from the buried wastes into the ground and thence to the ground water. The water-barrier sheet 4 covers the fiber optical cables 12 and is anchored at a top to the periphery of the excavated bow-shaped ground surface 1. The anchored top edges of the water-barrier sheet 4 are folded so that surface water is prevented from flowing down along the underside of the water-barrier sheet 4. Wastes 3 containing biodegradable organic substances, such as garbage, organic sludges, incinerated ashes, are dumped over the water-barrier sheet 4 to form a layer and buried or covered with a layer of sediment 21. Thus, the wastes 3 dumped over the water-barrier sheet 4 are stored layerwise in the waste disposal facility 2. The thus buried wastes 3 generate heat as the organic substances contained therein are degraded or decomposed by microbes in the earth as the time goes on. Water existing in or flowing through the buried wastes 3 is, therefore, heated to an elevated temperature.

Reference character A shown in FIG. 1 denotes a break formed by accident in the water-barrier sheet 4, and the arrow shown in FIG. 2 denotes the direction of flow of leakage water 13 (FIG. 6) flowing out from the break A toward a position denoted by reference character B. The bowl-shaped waste disposal site 1 shown in FIG. 1 is in a running state not filled up with the wastes 3.

The bottom surface 16 of the excavated bowl-shaped ground surface 1 is gently sloped so that water is smoothly collected in a drain channel or groove 20 provided at the lowermost portion of the bottom surface 16. A drain pipe 10 composed of a perforated pipe is received in the drain groove 20 via a suitable water-permeable material such as sand.

In the illustrated embodiment, the excavated ground surface 1 of the waste disposal facility 2 has a rectangular shape in the plan view or as viewed from the above (see FIG. 2), and the water-barrier sheet 4 is so placed as to over the bottom surface 16, the step 18 and the sloped side surfaces 17 of the excavated bowl-shaped ground surface 1 while keeping a sufficient degree of watertightness between itself and the ground surface 1 to preclude passage of rain water therethrough into the ground of the waste disposal facility 2. The rectangular shape of the excavated ground surface 1 may be changed into a circle, an oval, a polygon or any other shape according to the underlying requirements such as topography of the waste disposal site.

In a first embodiment shown in FIG. 3, the composite sheet 15 is placed beneath the water-barrier sheet 4 such that the water-permeable first layer (water-permeable mat) 8 is laid directly over the ground surface 1 and the drain groove 20 of the waste disposal facility 2. The water-impermeable second layer 9 is overlying the water-permeable layer or mat 8.

FIG. 4 shows a portion of a breakage detection system in the waste disposal facility 2 according to a second embodiment of the invention. In this embodiment, the water-impermeable second layer 9 of the composed sheet 15 is placed directly over the excavated bowl-shaped ground surface 1 of the waste disposal facility 2, and the water-permeable first layer 8 is overlying the water-impermeable layer 9.

Figure 5:
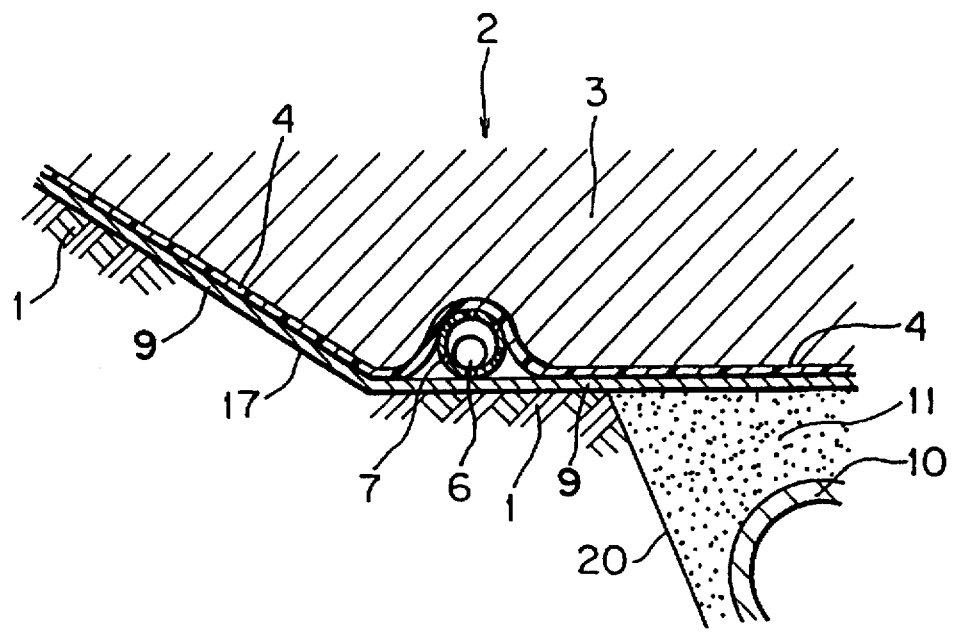
FIG. 5 is a view similar to FIG. 3, but showing a breakage detection system in the waste disposal facility according to still another embodiment of the present invention.

According to a third embodiment of the breakage detection system shown in FIG. 5, a water-impermeable sheet 9 is laid directly over the excavated bowl-shaped ground surface 1 of the waste disposal facility 2 so that the optical fiber 6 disposed on the water-impermeable sheet 9 together with the perforated tubular sheath 7 is isolated from ground water 19 (FIG. 1) flowing down along the sloped side surfaces 17 across the step 18 thus covered with the water-impermeable sheet 9.

In the first and second embodiments shown in FIGS. 3 and 4, respectively, the composite sheet 15 including the water-permeable elastic layer or mat 9 is disposed between the water-barrier sheet 4 and the ground surface 1 of the waste disposal facility 2 and supports thereon the optical fiber 6 received in the perforated tubular sheath 7. By virtue of the elastic layer or mat 9, the composite sheet 15 is able to accommodate surface irregularities on the ground 1 or projections on the water-barrier sheet 4 formed by downward projecting parts on the buried wastes 3. Thus, the water-barrier sheet 4 is highly resistant to damage or rupture. The water-impermeable second layer 9 of the composite sheet 15 provides a complete block or barrier against ground water 19 flowing or existing below the layer 9. With the barrier 9 thus provided, the optical fiber (temperature sensor) 6 is responsive exclusively to the temperature of leakage water 13 (FIG. 6) flowing out from the break A in the water-barrier sheet 4. With this arrangement, the position of the break A in the water-barrier sheet 4 can be detected with better accuracy.

The water-permeable first layer 8 is preferably made of a non-woven fabric, a drain mat or a similar water-permeable mat having a certain degree of elasticity. The water-impermeable first layer 9 is preferably composed of a coated or sprayed mortar layer, a bentonite-impregnated mat, a foamed polyethylene sheet, or a water-impermeable urethane mat.

In the arrangement shown in FIG. 3, the ground water 19 (FIG. 1) is guided to flow down along the water-permeable layer 8 of the composite sheet 15 and then collected into the drain pipe 10. On the other hand, according to the arrangement shown in FIG. 4, the leakage water (not designated but identical to one 13 shown in FIG. 6) is guided to flow down along the water-permeable layer 8 and collected into a drain pipe (not shown) in which instance the leakage water 13 is discharged from the waste disposal site 2 via an adequate treatment.

In the first and second embodiments shown in FIGS. 3 and 4, the optical fiber cables 12 (see FIG. 1) are disposed between the water-barrier sheet 4 and the water-impermeable layer 9 of the composite sheet 15, so that the temperature of leakage water can be detected by the temperature measuring instrument 14 via a temperature sensor composed of the optical fiber 6.

According to the third embodiment shown in FIG. 5, leakage water (not shown but identical to one 13 shown in FIG. 6) flows down along a space defined between the water-barrier sheet 4 and the water-impermeable sheet 9 and subsequently comes into contact with the optical fiber 6 received in the perforated tubular sheath 7 whereupon the temperature of leakage water and the position of the break A (FIGS. 1 and 2) in the water-barrier sheet 4 are detected by the temperature measuring instrument 14 via a temperature sensor composed of the optical fiber 6.

Figure 6:
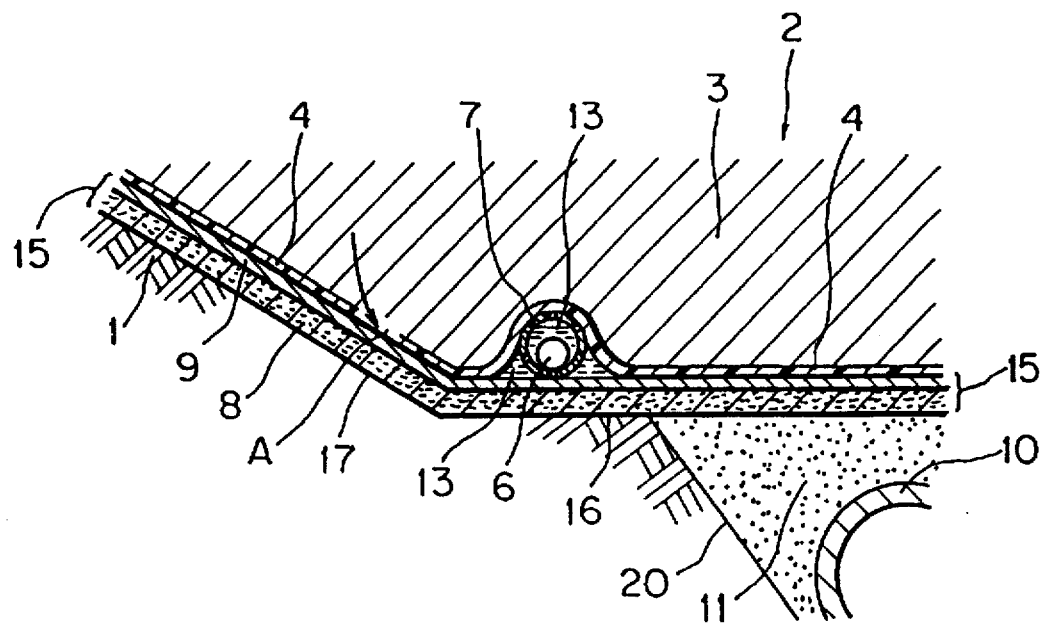
FIG. 6 is a view corresponding to FIG. 3, but showing the condition in which the position of a break in a water-barrier sheet, i.e., the position of leakage water is detected by an optical fiber of the breakage detection system of this invention.
Figure 7:
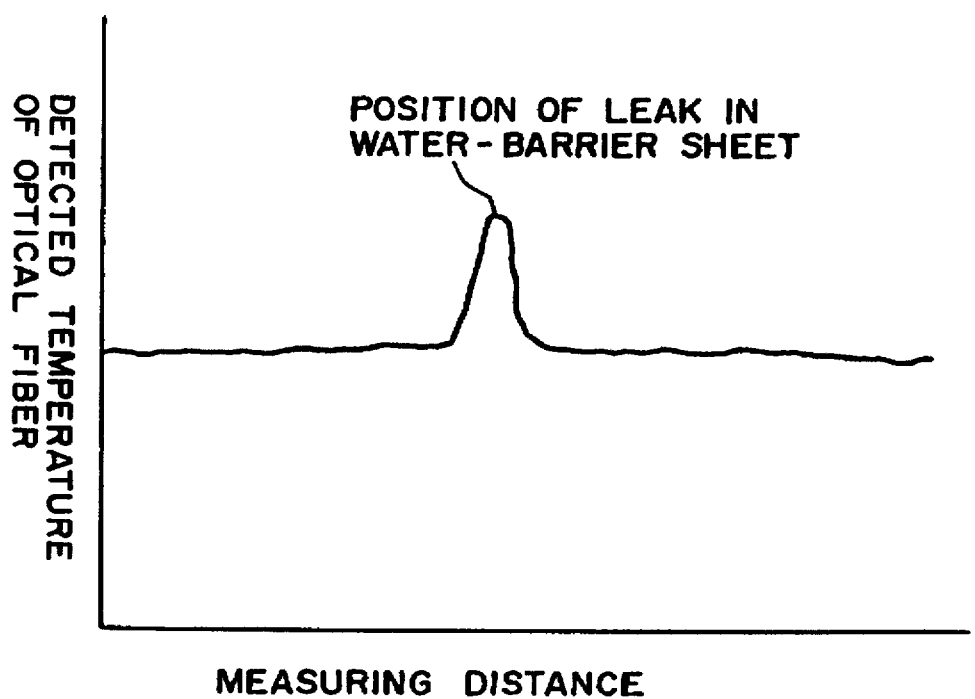
FIG. 7 is a graph showing the relationship between the detected temperature of the optical fiber and the measuring distance.

FIGS. 6 and 7 are illustrative of the manner in which the position of leakage water 13 and the position of a break A (FIGS. 1 and 2) in the water-barrier sheet 4 are identified based on the temperature detected by the temperature measuring instrument 14 via the optical fiber (temperature sensor) 6, and the distance from the temperature measuring instrument 14. According to the embodiment shown in FIG. 2, the leakage water flowing out from the broken part A of the water-barrier sheet 4 flows in the direction of the arrow and detected at the position B on the optical fiber 6.

As understood from the foregoing description, the waste disposal facilities of the present invention includes a breakage detection system which is capable of detecting the position of a break in a water-barrier sheet placed for isolating the ground of the waste disposal facility from wastes, with good accuracy and reliability in operation because it requires no expert knowledge for data analyzation, and is insusceptible to external disturbances such as underground current and leakage current. Furthermore, the breakage detection system is simple in construction and inexpensive to manufacture.

In a preferred embodiment of the invention, the breakage detecting system includes a water-permeable elastic mat placed beneath the water-barrier sheet and supporting thereon the optical fiber, so as to accommodate surface irregularities on the excavated ground surface and projections on the water-barrier sheets formed by projecting parts of the buried wastes. With the elastic mat thus provided, the water-barrier sheet is highly resistant to rupture or break. The water-permeable mat also has a function to facilitate smooth drainage of leakage water when disposed immediately below the water-barrier sheet and to facilitate smooth drainage of ground water when placed directly over the ground of the waste disposal facility. The breakage detection system further has a water-impermeable layer or sheet used either alone or in combination with the water-permeable mat so as to isolate the optical fiber from contact with ground water flowing or existing below the water-impermeable sheet. With the water-impermeable sheet thus provided, the optical fiber is responsive exclusively to the temperature of leakage water, making it possible to increase the detection accuracy.

Obviously, various minor changes and modifications of the present invention are possible in the light of the above teaching. It is therefore to be understood that within the scope of appended claims the invention may be practiced otherwise than as specifically described.

What is claimed is:

1. A system for detecting the position of a break in a water-barrier sheet placed in a waste disposal facility for isolating wastes dumped over the water-barrier sheet from the ground of the waste disposal facility, the wastes containing biodegradable organic substances and generating heat during biodegradation which elevates the temperature of water in the waste disposal facility, said system comprising:

(a) an optical fiber having first and second ends, the optical fiber being received in a perforated tubular sheath and laid in a predetermined pattern between the ground of the waste disposal facility and the water-barrier sheet together with the perforated sheath, the optical fiber having optical characteristics which change in response to a change in temperature caused when the optical fiber is flooded with water from the waste disposal facility flowing from a leak in the water-barrier sheet at a temperature elevated under the effect of heat generated during biodegradation of the organic substances contained in the waste; and (b) a temperature measuring instrument connected to the first and second ends of said optical fiber for detecting the position of the leak in the water-barrier sheet by detecting a change in the optical characteristics of said optical fiber.

2. A system according to claim 1, wherein the waste disposal facility has a contour extending in a depth direction, plural optical fibers are provided, and said plural optical fibers are arranged in a pattern of concentric loops radially spaced at regular intervals to extend the along the contour of the waste disposal facility.

3. A system for detecting the position of a break in a water-barrier sheet placed in a waste disposal facility for isolating wastes dumped over the water-barrier sheet from the ground of the waste disposal facility, the wastes containing biodegradable organic substances and generating heat during biodegradation which elevates the temperature of water in the waste disposal facility, said system comprising:

(a) a composite sheet composed of a water-permeable first layer and a water-impermeable second layer, the water permeable first layer being formed of an elastic sheet material, and said composite sheet being placed beneath the water-barrier sheet;

(b) an optical fiber having first and second ends, the optical fiber being loosely received in a perforated tubular sheath and laid in a predetermined pattern between said composite sheet and the water-barrier sheet together with said perforated tubular sheath, said optical fiber having optical characteristics which change in response to a change in temperature caused when the optical fiber is flooded with water from the waste disposal facility flowing from a leak in the water-barrier sheet at a temperature elevated under the effect of heat generated during biodegradation of the organic substances contained in the wastes; and (c) a temperature measuring instrument connected to the first and second ends of said optical fiber for detecting the position of the leak in the water-barrier sheet by detecting a change in the optical characteristics of said optical fiber.

4. A system according to claim 3, wherein the waste disposal facility has a contour extending in a depth direction, plural optical fibers are provided and said plural optical fibers are arranged in a pattern of concentric loops radially spaced at regular intervals to extend the along the contour of the waste disposal facility.

5. A system according to claim 3, wherein said water-permeable first layer of said composite sheet faces said optical fiber.

6. A system according to claim 3, wherein said water-impermeable second layer of said composite sheet faces said optical fiber.

* * * * *